United States Patent [19]

Oberley

[11] 3,986,881

[45] Oct. 19, 1976

[54] COMPOSITIONS FOR IMPARTING FIRE RETARDANCE TO WOOD

[75] Inventor: William J. Oberley, Monroeville, Pa.

[73] Assignee: Koppers Company, Inc., Pittsburgh, Pa.

[22] Filed: Sept. 30, 1974

[21] Appl. No.: 510,408

[52] U.S. Cl. .............................. 106/15 FP; 252/8.1; 260/29.4 R; 260/67.6 R; 260/72 R
[51] Int. Cl.² ......................................... C09D 5/18
[58] Field of Search ............ 106/15 FP; 260/29.4 R, 260/72 R, 67.6 R, DIG. 24; 252/8.1

[56] References Cited
UNITED STATES PATENTS

| | | | |
|---|---|---|---|
| 2,681,326 | 6/1954 | Christianson | 260/67.6 R |
| 3,509,021 | 4/1970 | Woodward | 260/29.4 R |
| 3,832,316 | 8/1974 | Juneja | 260/29.4 R |
| 3,874,990 | 4/1975 | Surdyk | 106/15 FP |

*Primary Examiner*—Lorenzo B. Hayes
*Attorney, Agent, or Firm*—Herbert J. Zeh, Jr.; Oscar B. Brumback

[57] ABSTRACT

Chemical compositions are disclosed for imparting fire retardancy to wood comprising an aqueous solution of partially reacted monomethylol dicyandiamide, melamine and phosphoric acid having a molar ratio of ingredients of monomethylol dicyandiamide to melamine of from about 11.5:1.0 to about 3.0:1.0 and a mole ratio of phosphoric acid to monomethylol dicyandiamide plus melamine of from about 1.0:1.0 to 1.0:1.5. The wood is impregnated with dilute aqueous solutions of the partially reacted chemical composition and then cured in the wood to impart to the wood low hygroscopic, leach resistant, fire retardant properties.

4 Claims, No Drawings

COMPOSITIONS FOR IMPARTING FIRE RETARDANCE TO WOOD

BACKGROUND OF THE INVENTION

This invention is directed to the chemical treatment of wood to render the same fire retardant. More particularly, this invention is directed to chemical compositions which impart leach resistant, flame retardancy to wood and which do not make the wood significantly more hygroscopic. More specifically, this invention is directed to the treatment of wood with a chemical composition comprising partially reacted monomethylol dicyandiamide, melamine and phosphoric acid to impart to the wood leach resistant flame retardant properties.

It has become the practice in the wood treating industry to treat wood with chemical compounds to produce flame retardant wood. The chemicals commonly used for this purpose include ammonium phosphate, ammonium chloride, ammonium sulfate, borax, boric acid, phosphoric acid, zinc chloride, and magnesium chloride. These chemicals are impregnated as solutions into the wood where they are deposited within the pores of the wood when the solution evaporates. However, these chemicals are only suitable for treating wood which is not subject to the leaching effect of rain and/or ground water. These chemicals are not suitable for exterior and underground construction where leach resistant fire retardants are necessary. In addition, some of these chemicals are objectionable because they are very corrosive to any metal which may be in cotact with the treated wood. Some of the chemicals also cause an objectionable afterglow with the wood and are detrimental to the structural strength of the treated wood. Moreover, many of these chemicals are hygroscopic which causes the wood to absorb moisture and bloom which makes their use objectionable.

More recently, there has been a trend in the wood treating industry towards fire retardant chemical treatments which have low hygroscopicity and are leach resistant and which can be used for exterior wood. Many of these fire retardant chemical treatments for exterior wood have been based on amine-aldehyde-phosphorus condensation compounds. In accordance with the general practice, wood is impregnated with a solution of an incompletely reacted amine-aldehyde-composition together with an oxy acid of phosphorus. The impregnated wood is then dried and cured.

See for example, Goldstein et al, U.S. Pat. No. 2,917,408 which descloses the preparation of fire retardant wood with a combination of dicyandiamide and phosphoric acid and Goldstein et al, U.S. Pat. No. 3,159,503 which discloses the preparation of fire retardant wood with a combination of dicyandiamide, phosphoric acid and very small amounts of formaldehyde. In addition, see Juneja, U.S. Pat. No. 3,832,316 which discloses a composition for imparting fire retardancy to wood comprising dicyandiamide, melamine, formaldehyde and phosphoric acid and Juneja, Canadian Pat. No. 917,334 which discloses a composition for treating wood to impart fire retardancy thereto comprising dicyandiamide, urea, formaldehyde and phosphoric acid.

It has also been known in the past to treat textile materials with similar compositions. For example, see Pingree et al, U.S. Pat. No. 2,488,034, Juda et al, U.S. Pat. No. 2,628,946, Ford et al, U.S. Pat. No. 2,482,755 and O'Brien et al, U.S. Pat. No. 3,625,753. In particular, see Burrnell et al, U.S. Pat. No. 2,582,961 which discloses compositions for treating textiles to impart fire retardance thereto comprising methylol dicyandiamides, methylol melamines and phosphoric acid.

While most of the above described chemical compositions based on dicyandiamide, melamine, urea, formaldehyde and phosphoric acid are effective for imparting fire retardancy to wood, they suffer from one or more drawbacks. For example, the compositions of Goldstein et al are not leach resistant and are not as effective as desired. Compositions based on the above ingredients are convenient to use when the wood treating is performed at the plant site where the chemical compositions are prepared. For example the dicyandiamide, melamine, formaldehyde and phosphoric acid are prepared as an aqueous solution which is used to impregnate the wood. However, the aqueous solution only has a storage life of several weeks at low temperatures, and, therefore, shipping the final chemical solution to distant treating plants is not practical. The storage life of the treating solution may be extended by not adding the phosphoric acid until the solution is ready to be used. However, solutions of the melamine, dicyandiamide and formaldehyde have limited storage life.

Therefore, it is an object of this invention to provide a leach resistant, fire retardant treatment for wood with low hygroscopicity based on melamine, dicyandiamide, formaldehyde and phosphoric acid. It is also an object of this invention to provide chemical compositions based on dicyandiamide, melamine and formaldehyde which can be shipped economically, have excellent storage life, and which can be dissolved in water and then reacted with phosphoric acid to provide a chemical treating solution which will impart leach resistant fire retardant properties to wood and will not make the wood hygroscopic.

SUMMARY OF THE INVENTION

In accordance with this invention, chemical compositions for imparting fire retardancy to wood are provided. The chemical compositions are aqueous solutions of partially reacted monomethylol dicyandiamide, melamine and phosphoric acid. The mole ratio of monomethylol dicyandiamide to melamine in the compositions must be within the range of from about 11.5:1.0 to about 3.0:1.0 and the mole ratio of phosphoric acid to monomethylol dicyandiamide plus melamine is within the range of from about 1.0:1.0 to about 1.0:1.5. The wood is impregnated with a solution of the partially reacted ingredients and the impregnated wood is, thereafter, dried and cured by heating to a temperature of from about 60° to 110° C.

The aqueous treating solution comprises from about 6 to about 80 percent by weight of the incomplete reaction product of monomethylol dicyandiamide, melamine and phosphoric acid and from 20 to 94 percent by weight water. Solutions containing greater than about 80 percent are much too viscous to use for wood treating and also very difficult to ship and maintain stable. The concentration of the aqueous solution used for treating wood should be from about 6 percent by weight to about 30 percent by weight.

The mole ratio of monomethylol dicyandiamide to melamine in the aqueous treating solution must be within the range of from about 11.5:1.0 to about 3.0:1.0. The mole ratio of phosphoric acid to combined monomethylol dicyandiamide and melamine must be within the range of from about 1.0:1.0 to about 1.0:1.5.

It is important that the aqueous composition have a mole ratio of phosphoric acid to monomethylol dicyandiamide plus melamine of from about 1.0:1.0 to 1.0:1.5. If the amount of phosphoric acid is greater than the 1.0:1.0 ratio, the stability is extended but leach resistance is reduced although unleached fire retardancy is increased. If the amount of phosphorus is less than the 1:1.5 ratio, solution stability is reduced and the treated wood may not be sufficiently fire retardant unless unusual treating conditions are employed.

It is also important that the ratio of monomethylol dicyandiamide to melamine be within the range of from about 11.5:1.0 to about 3.0:1.0. If more melamine is used the stability of the solution is decreased with no significant increase in leach resistance. If less melamine is used the stability of the solution is increased but the leach resistance is reduced.

The term phosphoric acid as used herein is meant to be inclusive of all of the oxy acids of phosphorus. The term phosphoric acid is inclusive of such forms as $H_3PO_4$, $H_3PO_3$, $2H_3PO_4 \cdot H_2O$, $H_4P_2O_7$, $H_4P_2O_6$, $HPO_3$, the polyphosphoric acids and mixtures of the above.

Another important feature of this invention is that no free formaldehyde is present. The aqueous solution does not contain any free formaldehyde. All of the formaldehyde has been prereacted to form monomethylol dicyandiamide. This is important since solid compositions containing the required ratio of monomethylol dicyandiamide to melamine can be prepared. These solid compositions can be easily shipped to treating plants where they are readily dissolved in water and then phosphoric acid is added to give the desired aqueous treating solution. Additionally since there is no free formaldehyde present, concentrated aqueous solutions of the monomethylol dicyandiamide and melamine can be prepared and shipped to treating plants. At the treating plants they may be readily diluted with water and the phosphroic acid added to give the useful treating compositions of this invention.

The solid compositions of this invention are comprised of an admixture of monomethylol dicyandiamide and melamine wherein the molar ratio of monomethylol dicyandiamide to melamine is from about 11.5:1.0 to about 3.0:1.0. The solid compositions are stable under normal conditions for greater than six months and under refrigerated conditions for greater than a year. The solid compositions may be dissolved in water to yield solutions of monomethylol dicyandiamide, melamine and their reaction products which have a storage life of several months. Phosphoric acid may be added to these solutions to form the aqueous wood treating composition of this invention. The solution containing the phosphoric acid has good stability and may be used for several weeks and even longer depending on such factors as the concentration of the solution and refrigeration of the solution.

The aqueous wood treating solution containing the partially reacted monomethylol dicyandiamide, melamine, and phosphoric acid is conveniently prepared as follows. The solid composition containing the requisite ratio of monomethylol dicyandiamide and melamine is dissolved in water. The solid composition contains the monomethylol dicyandiamide and melamine and very small amounts of the reaction product of monomethylol dicyandiamide and melamine. Then the solution is cooled and the necessary amount of phosphoric acid is added. The percent solids concentration of the solution is adjusted by adding water. After the monomethylol dicyandiamide, melamine, and phosphoric acid are dissolved in the water, they slowly react to form condensation reaction products. This aqueous solution of partially reacted monomethylol dicyandiamide, melamine, and phosphoric acid is the desired wood treating composition. The aqueous wood treating solution is clear and stable for several weeks or longer depending on how cool the solution is maintained, how many times it is used and other factors which are readily apparent. After several weeks, the treating solution becomes hazy and insoluble precipitates are formed. This is caused by the ingredients reacting to form insoluble condensation products which are not useful in the wood treating of the present invention.

It is also possible to prepare the treating solutions of this invention by diluting a concentrated solution of monomethylol dicyandiamide and melamine having the required molar ratio of ingredients with water and then adding the phosphoric acid in the required amount. Alternatively, the treating solution may be prepared by dissolving monomethylol dicyandiamide and melamine in water and then adding the phosphoric acid. Whatever method of preparation is used, the result is an aqueous solution of partially reacted monomethylol dicyandiamide, melamine, and phosphoric acid.

The aqueous solutions prepared in the above manner and having the required molar ratio of ingredients are useful in imparting reduced hygroscopicity and leach resistant fire retardant properties to wood. The wood may be treated by one of the various techniques which are will known in the art. Examples of some of these methods are soaking, diffusion into green wood, vacuum pressure impregnation, compression impregnation, and the like. The particular technique used will be determined by such factors as the species of wood being treated, the thickness of the wood, the degree of fire retardancy required and the end use of the treated wood product. In addition, the percent solids concentration of the aqueous impregnating solution will be dictated to a large extent by the treating method employed and the degree of fire retardance required.

After being treated with the aqueous solution of fire retardant chemicals, the wood is thereafter dried and cured generally by heating to a temperature of from about 60° to 110° C. The wood after treatment may be first dried in a conventional manner to a fairly low moisture content at a temperature between about 40° and 70° C. Thereafter, it is cured by heating it to a temperature between about 60° and 110° C. Curing temperatures greater than about 110° C. should not be used since they may have an adverse effect on the properties of the wood. However, care must be taken to be sure that sufficient temperatures and times are used properly to cure the impregnated wood. If the impregnated wood is not properly cured, the chemicals will not be fixed within the cellular structure of the wood and will be leached away upon exposure to water. Often it is convenient to cure the impregnated wood initially at about 70° C. and then a final cure at about 105° C. The curing temperature, curing time, and other curing conditions will be dependent on the size and properties of the impregnated wood and other factors well known in the wood treating art. The best conditions may be readily determined by one of ordinary skill in the art.

The wood treated in accordance with this invention has leach resistant fire retardant properties, has improved dimensional stability and has reduced hygroscopicity. In addition, the treated wood does not bloom.

Numerous experiments have been performed which demonstrate the effectiveness of this invention. The following examples illustrate the invention but should not be construed to limit the same.

EXAMPLE 1

An aqueous wood treating solution of partially reacted monomethylol dicyandiamide, melamine, and phosphoric acid was prepared as follows. A solid composition containing monomethylol dicyandiamide (MMD) and melamine was prepared by admixing 152 pounds of monomethylol dicyandiamide (1.35 lb/moles) and 32 pounds of melamines (0.25 lb/moles). The resulting solid composition had a mole ratio of MMD to melamine of 5.4:1.0 and was stable for at least one year at room temperature and may be easily shipped to a wood treatment plant. One hundred and eighty-four pounds of the solid composition was dissolved in 184 pounds of water at temperatures of from about 50° C. to 80° C. Then the solution was diluted with cold water until the resulting solution was about 8.0% by weight active solids. The dilute solution was cooled to about 30° C. and then 261 pounds of 75% phosphoric acid (1.25 lb/moles) was slowly added. The resulting solution contained 14.8% active ingredients and was very useful in treating wood to impart leach resistant, non hygroscopic fire retardant properties to the wood.

EXAMPLE 2

An aqueous wood treating solution of partially reacted MMD melamine, and phosphoric acid was prepared as follows. First 4,810 pounds of 37% formaldehyde solution (59.33 lb/moles) was added to the reactor and heated to about 70° C. Then 5,000 lbs. of dicyandiamide (59.52 lb/moles) was added with stirring over a 30 minute period. After all the dicyandiamide was added and dissolved, the dicyandiamide and formaldehyde were reacted until all free formaldehyde had been reacted (about 30 minutes). After the dicyandiamide and formaldehyde were reacted to form the MMD, 1,400 lbs. of melamine (11.11 lb/moles) was added and the reaction mixture held at 70° C. This solution may be cooled and shipped to treating plants or stored as is. It may also be diluted before shipping, storing, or using. The above solution was mixed with 14,511 pounds of water to give a solution which was 30% by weight active solids. This 30% solution was then mixed with 7,443 lbs. of 75% by weight phosphoric acid (56.95 lb/moles) and diluted with 84,544 pounds of water to yield 119,254 pounds of an aqueous wood treating composition which was 11.54% by weight active solids.

EXAMPLE 3

An aqueous wood treating solution of partially reacted monomethylol dicyandiamide, melamine, and phosphoric acid was prepared as follows. First, 15.2 pounds of MMD (0.135 lb/moles) and 3.2 pounds of melamine (0.025 lb/moles) were dissolved in 18.4 lbs. of water at 70° C. Then the resulting solution was cooled and 147.2 pounds of water were added. This solution was cooled to 30° C. and then 20.90 pounds of 75% phosphoric acid (0.16 lb/moles) was added. The resulting solution is then diluted to 12.5% by weight by the addition of water and is ready to use to treat wood.

EXAMPLE 4

The leach resistant properties of wood treated with the compositions of this invention were compared to the leach resistance of prior art treatments. A series of ponderosa pine specimens which were 1¼ by ¾ by ½ in. were treated with the various fire retardant chemical compositions of the prior art and with the compositions of this invention (composition similar to Example 1). The leach resistance of the treated wood was determined and compared on a relative scale of from 1 to 10. The results are shown in Table 1. The samples were treated using the full cell method with a cycle of 30 minutes under a vacuum of 22 inches of Hg and then 2 hours at atmospheric pressure. This provided a treatment to refusal. After treatment the samples were cured by air drying for 16 hours at room temperature followed by 24 hours at 50° C. and 24 hours at about 105° C. The treated and cured samples were then sliced into microtome sections of about 3 mils thick. One-half of the slices (every other one) were placed in a U tube and the other half were retained as the control. The sample in the U tube (about 2 gms) was leached with 15,000 gm of water over a 7½ hour period. Then the leached and unleached samples were ground up and analyzed to determine the leach resistance of the sample.

Table 1

| Sample No. | Treatment | Relative Leach Resistance Value |
| --- | --- | --- |
| 1 | Combination of Borate, Sulfate and Phosphate Salts | 0 |
| 2 | Composition as in Canadian Patent 917,334 | 2.2 |
| 3 | Composition as in Goldstein U.S. Patent 2,917,408 | 2.5 |
| 4 | Composition as in U.S. Patent 3,832,316 | 7.5 |
| 5 | Composition sold as Non-Com Exterior by Koppers Company, Inc. | 8.7 |
| 6 | Composition of this invention (same as composition of Example 1) | 10.0 |

EXAMPLE 5

The fire retardant properties of wood treated with the compositions of this invention were evaluated using ASTM E69-50 procedure B. The results are shown in Table 2 for three samples treated with a composition similar to that described in Example 2. The samples of wood were ponderosa pine having dimensions of 40 by ¾ by ⅜. The samples were treated using the full cell method with 30 minutes at a vacuum of 20 inches of Hg and 1 hour at 160 p.s.i. These conditions provided the desired treatment to refusal. The treated wood was cured by air drying at room temperatures for 16 hours followed by 24 hours at 50° C. and 24 hours at about 105° C.

Table 2

| Sample | % Wt. Loss | Flame Spread Observations | | | | |
|---|---|---|---|---|---|---|
| | | 30 Sec. | 1 Min. | 2 Min. | 3 Min. | 4 Min. |
| 1 | 16.8 | H 5 | 6 | 8 | 8 | 7 |
| | | T 100 | 132 | 170 | 170 | 163 |
| 2 | 18.8 | H 5 | 7 | 8 | 8 | 10 |
| | | T 87 | 122 | 162 | 173 | 190 |
| 3 | 16.6 | H 8 | 8 | 9 | 9 | 9 |
| | | T 80 | 112 | 140 | 162 | 158 |

The treated wood of this invention was also observed for hygroscopicity and blooming. It was observed that the treated wood did not show a hygrosocpicity greater than untreated wood. Also the wood did not shown signs of blooming even after normal exposure over a one-year period.

I claim:

1. A composition useful for imparting non-hygroscopic, leach resistant fire retardant properties to wood comprising an 6 to 80 percent by weight aqueous solution of partially reacted monomethylol dicyandiamide, melamine, and phosphoric acid wherein the molar ratio of monomethylol dicyandiamide to melamine is from about 11.5:1.0 to 3.0:1.0 and wherein the molar ratio of the phosphoric acid to monomethylol dicyandiamide plus melamine is from about 1.0:1.0 to 1.0:1.5.

2. A composition as in claim 1 wherein the concentration of the aqueous solution is from about 6 to about 30% by weight.

3. A solid composition useful for preparing wood treating compositions comprising an admixture of monomethylol dicyandiamide and melamine wherein the molar ratio of monomethylol dicyandiamide to melamine is from about 11.5:1.0 to 3.0:1.0.

4. An aqueous composition useful for preparing wood treating compositions comprising an aqueous solution of monomethylol dicyandiamide and melamine wherein the molar ratio of monomethylol dicyandiamide to melamine is from about 11.5:1.0 to 3.0:1.0.

* * * * *